United States Patent
Basu et al.

(10) Patent No.: US 9,196,267 B2
(45) Date of Patent: Nov. 24, 2015

(54) DATA WRITER WITH FLUX DENSITY INSERT

(71) Applicant: Seagate Technology LLC, Cupertino, CA (US)

(72) Inventors: Swaraj Basu, Londonderry (GB); Mark Gubbins, Letterkenny (IE); Muhammad Asif Bashir, Londonderry (GB); Prim Gangmei, Londonderry (GB)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/931,340

(22) Filed: Jun. 28, 2013

(65) Prior Publication Data

US 2015/0002959 A1   Jan. 1, 2015

(51) Int. Cl.
| G11B 5/11 | (2006.01) |
| G11B 5/127 | (2006.01) |
| G11B 5/235 | (2006.01) |
| G11B 5/31 | (2006.01) |

(52) U.S. Cl.
CPC ............... *G11B 5/11* (2013.01); *G11B 5/1278* (2013.01); *G11B 5/235* (2013.01); *G11B 5/315* (2013.01); *G11B 5/3116* (2013.01); *G11B 5/3143* (2013.01); *G11B 5/112* (2013.01)

(58) Field of Classification Search
None
See application file for complete search history.

(56) References Cited

U.S. PATENT DOCUMENTS

| 6,707,642 | B1 | 3/2004 | Batra |
| 7,002,775 | B2 | 2/2006 | Hsu et al. |
| 7,337,530 | B1 | 3/2008 | Stoev et al. |
| 7,441,325 | B2 * | 10/2008 | Gao et al. ................... 29/603.16 |
| 7,639,450 | B2 * | 12/2009 | Hsu et al. ................. 360/125.02 |
| 7,649,712 | B2 * | 1/2010 | Le et al. ..................... 360/125.3 |
| 7,804,662 | B2 * | 9/2010 | Chen et al. ............... 360/125.12 |
| 7,848,054 | B2 * | 12/2010 | Hsiao et al. .............. 360/125.09 |
| 7,872,835 | B2 * | 1/2011 | Guan .......................... 360/319 |
| 7,950,137 | B2 * | 5/2011 | Bonhote et al. ............ 29/603.16 |
| 8,120,874 | B2 * | 2/2012 | Hsiao et al. .............. 360/119.04 |
| 8,173,028 | B2 * | 5/2012 | Ishizaki et al. ................. 216/22 |
| 8,279,562 | B2 * | 10/2012 | Gao et al. ...................... 360/319 |
| 8,289,647 | B2 * | 10/2012 | Benakli et al. ........... 360/119.04 |
| 8,419,954 | B1 * | 4/2013 | Chen et al. ..................... 216/22 |
| 8,472,136 | B2 * | 6/2013 | Batra et al. ............... 360/119.04 |
| 8,542,462 | B2 * | 9/2013 | Maruyama et al. ........ 360/125.3 |
| 8,578,594 | B2 * | 11/2013 | Jiang et al. ................. 29/603.16 |
| 8,582,238 | B1 | 11/2013 | Liu et al. |
| 8,611,046 | B2 * | 12/2013 | Wu et al. .................... 360/125.3 |
| 8,649,125 | B1 * | 2/2014 | Basu et al. ................. 360/125.3 |
| 8,810,964 | B2 * | 8/2014 | Gao et al. ................... 360/125.3 |
| 8,830,625 | B2 * | 9/2014 | Linville et al. ............. 360/125.3 |
| 8,830,626 | B2 * | 9/2014 | Heim et al. ................. 360/125.3 |
| 8,854,773 | B2 * | 10/2014 | Sapozhnikov et al. ....... 360/319 |
| 2007/0035878 | A1 * | 2/2007 | Guthrie et al. ................ 360/125 |
| 2007/0253107 | A1 * | 11/2007 | Mochizuki et al. ........... 360/126 |

(Continued)

FOREIGN PATENT DOCUMENTS

WO     2012/036680 A1    3/2012

*Primary Examiner* — Brian Miller
(74) *Attorney, Agent, or Firm* — Hall Estill Attorneys at Law (57) ABSTRACT

A data writer may be generally configured at least with a write pole adjacent to and separated from a side shield and a trailing shield. The side shield may be formed of a first material and configured with a trailing box region that is at least partially filled with a flux density insert formed of a second material that is different than the first material.

20 Claims, 5 Drawing Sheets

(56) References Cited

U.S. PATENT DOCUMENTS

| | | |
|---|---|---|
| 2008/0273268 A1* | 11/2008 | Hsiao et al. ............... 360/234.6 |
| 2008/0273277 A1* | 11/2008 | Guan et al. ................... 360/319 |
| 2008/0278862 A1 | 11/2008 | Kameda et al. |
| 2009/0168240 A1 | 7/2009 | Hsiao et al. |
| 2009/0273863 A1* | 11/2009 | Kawano et al. ............... 360/319 |
| 2010/0232072 A1* | 9/2010 | Dimitrov et al. ............... 360/319 |
| 2010/0321835 A1* | 12/2010 | Zhang et al. ................... 360/319 |
| 2011/0205671 A1* | 8/2011 | Benakli et al. ................ 360/319 |
| 2012/0314325 A1 | 12/2012 | Wessel et al. |
| 2013/0016442 A1 | 1/2013 | Benakli et al. |

* cited by examiner

DATA WRITER WITH FLUX DENSITY INSERT

SUMMARY

Some embodiments are generally directed to a magnetic element capable of being used to program data bits in various data storage environments.

In accordance with an example embodiment, a write pole may be positioned adjacent to and separated from side and trailing shields. The side shield may be formed of a first material and configured with a trailing box region that is at least partially filled with a flux density insert formed of a second material that is different than the first material.

DETAILED DESCRIPTION

Demand for high data capacity and fast data access speeds in reduced form factor data storage devices has emphasized the physical size of transducing components like data readers, data writers, and magnetic shields. Such reduction in physical size may correspond with diminished performance as inadvertent magnetic conditions like shunting and domain wall movement degrade operating capabilities of the transducing components. While diverse shielding configurations have been proposed to mitigate inadvertent magnetic conditions, issues like data erasure continue to inhibit optimization of transducing components. Hence, there is a continued industry demand for magnetic shielding with optimized magnetic performance in reduced form factor data storage devices.

With magnetic shielding issues in mind, a data writer can be configured with a write pole positioned adjacent to and separated from side and trailing shields with the side shield formed of a first material and configured with a trailing box region that is at least partially filled with a flux density insert formed of a second material that is different than the first material. The positioning of the flux density insert downtrack and along the trailing edge of the write pole can optimize write field and write field gradient while enhancing shielding of the write pole. The flux density insert and trailing box region may be tuned to define diverse write pole magnetic extents and contain magnetic flux within the predetermined magnetic extent, which corresponds with reduced erasure conditions and maintaining high magnetic fields from the write pole.

Figure 1:
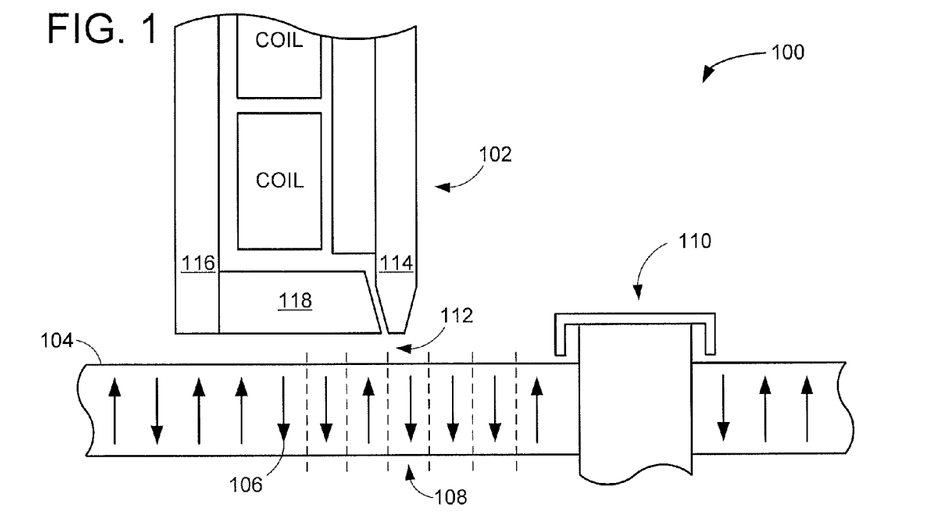
FIG. 1 is a block representation of an example data storage device constructed and operated in accordance with various embodiments.

A magnetic element that utilizes tuned trailing box and flux density insert may be implemented into an unlimited variety of data storage environments. FIG. 1 provides a block representation of a portion of an example data storage device 100 operated in a data storage environment in accordance with various embodiments. The data storage device 100 is shown in a non-limiting configuration where a transducing head 102 can be positioned over a variety of locations on a magnetic storage media 104 where stored data bits 106 are located on predetermined data tracks 108. The storage media 104 can be attached to one or more spindle motors 110 that rotate during use to produce an air bearing 112 on which at least a write pole 114, return pole 116, and magnetic shield 118 of the transducing head 102 reside and interact through to program the data bits 106 to predetermined magnetic orientations.

While the transducing head 102 is displayed exclusively as a magnetic writer, one or more transducing elements, such as a magnetically responsive reader can concurrently be present in the transducing head 102 and communicating with the data storage media 104. Continued emphasis on minimizing the physical and magnetic size of the transducing head 102 is compounded by the increased data bit density and reduced data track 108 width of the data storage media 104 to stress the form and function of magnetic shields to define and maintain a predetermined magnetic extent for the write pole 114 that allows access to individual data bits 106 without inadvertently imposing magnetic flux onto adjacent data tracks 108 in an erasure condition.

Figure 2:
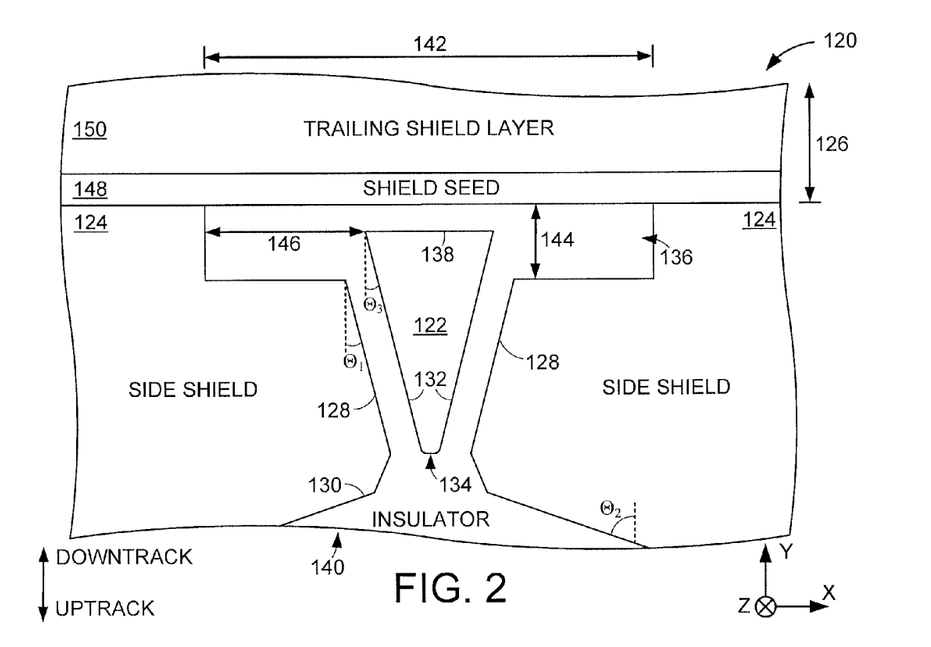
FIG. 2 illustrates an air bearing view block representation of an example magnetic element capable of being used in the data storage device of FIG. 1.

FIG. 2 displays an air bearing view block representation of a portion of an example transducing element 120 capable of being implemented into the data storage device 100 of FIG. 1. As shown, a trapezoid shaped write pole 122 is positioned between lateral side shields 124 along the X axis and uptrack from a trailing shield 126. The shields 124 and 126 may be formed of common or dissimilar magnetically soft materials like NiFe and CoFe that maintain magnetic fields proximal the write pole 122 while keeping errant external magnetic fields from entering a predetermined magnetic extent and interfering with the operation of the write pole 122.

The write pole 122 can be tuned by adjusting the shape of the write pole 122, the non-magnetic gap distance between the write pole 122 and side shields 124, and the side shield sidewall angles $\theta_1$ and $\theta_2$ to define the scope of magnetic flux transmission from the write pole 122. That is, the side shields 124 can be individually or collectively shaped to have sidewalls 128 and 130 angled to be similar or dissimilar compared to the angle $\theta_3$ of the write pole sidewalls 132 from the write pole tip 134 to a trailing box region 136 proximal the trailing edge 138 of the write pole 122. As shown, the side shields sidewalls 130 are shaped to provide a throat region 140 that is proximal the write pole tip 134 and filled with non-magnetic insulating material, such as alumina, to reduce shunting of magnetic flux from the write pole 122 to the side shields 124.

Similarly, the trailing box region 136 is defined by the side shields 124 and filled with non-magnetic insulating material to reduce or eliminate shunting between the write pole 122 and downtrack portions of the side shields 124 as well as the trailing shield 126. The removal of soft magnetic shielding material to define the trailing box regions 136 can be tuned to have a width 142, thickness 144 along the Y axis, and distance 146 from the trailing edge 138 of the write pole 122 to provide a balance of shielding capability and magnetic shunting. The size and function of the trailing box region 136 may be influenced by the material and thickness of the shield seed 148, trailing shield layer 150, and side shield 124, which can provide a predetermined downtrack and cross-track shielding capability that allows the trailing box region 136 to be larger to mitigate shunting risk without degrading shielding capability of the trailing 126 and side 124 shields.

By positioning the side shields 124 proximal the write pole 122 near the write pole tip 134, more magnetic flux is maintained in the write pole 122 to increase write field amplitude and gradient. However, the lack of any magnetic material along the trailing edge distance 146 can allow magnetic flux to be present distal the write pole 122, which can lead to unwanted erasure of data bits positioned on data tracks adjacent to the predetermined magnetic extent of the write pole 122. Accordingly, the trailing box region 136 can be partially or completely filled with a magnetic flux density insert that reduces shunting between the shields 124 and 126 and write pole 122 while preserving increased magnetic field amplitude and gradient provided by the lack of soft magnetic shielding material proximal the trailing edge 138 of the write pole 122.

Figure 3:
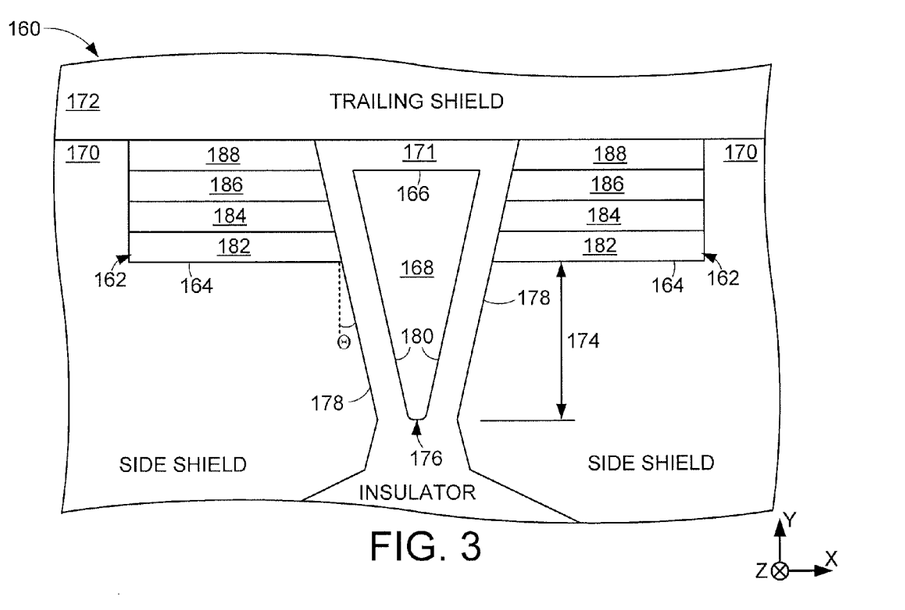
FIG. 3 shows an air bearing view block representation of a portion of an example magnetic element configured in accordance with some embodiments.

FIG. 3 displays an air bearing view block representation of a portion of an example magnetic element configured in accordance with some embodiments to have magnetic flux density inserts 162 that fill the trailing box region 164 proximal the trailing edge 166 of the write pole 168. The magnetic flux density inserts 162 can have similar or dissimilar configurations to provide a predetermined saturation flux density ($B_S$) that is lower than the side 170 and trailing 172 shields, but higher than the non-magnetic insulating material 171 that separates the write pole 168 from the shields 170 and 172.

Such difference in saturation flux density between the flux density inserts 162 and the shields 170 and 172 can be achieved, in some embodiments, by configuring at least one flux density insert 162 as a solid layer of material with a continuous saturation flux density. In the non-limiting embodiment shown in FIG. 3, each flux density insert 162 is configured as a vertical lamination of multiple different materials that each have different saturation flux densities that begin from a horizontal plane, along the X axis, a predetermined distance 174 from the write pole tip 176 of the write pole 168 or from the trailing shield 172. The respective flux density inserts 162 may further be tuned by maintaining the side shield sidewall 178 angle, which may match or be different from the pole sidewall 180 angle, from the write pole tip 176 to the trailing shield 172.

While the number of constituent layers, thickness of those layers, and size of the trailing box region 162 can be tuned to be different from the example embodiment shown in FIG. 3, the trailing box may have a lateral depth of 50-500 nm along the X axis and more than, less than, or equal to half of the write pole longitudinal length along the Y axis from tip 176 to the trailing edge 166. The vertical lamination configuration of the flux density inserts 162 can allow a gradual reduction or increase in saturation flux density along the downtrack direction. In other words, the first 182, second 184, third 186, and fourth 188 flux density insert layers can have increasing or decreasing saturation flux densities in accordance with various embodiments to provide a predetermined saturation flux density profile along the Y and downtrack axis to reduce the risk of erasure while optimizing write field amplitude and field-gradient for the write pole 168.

Figure 4:
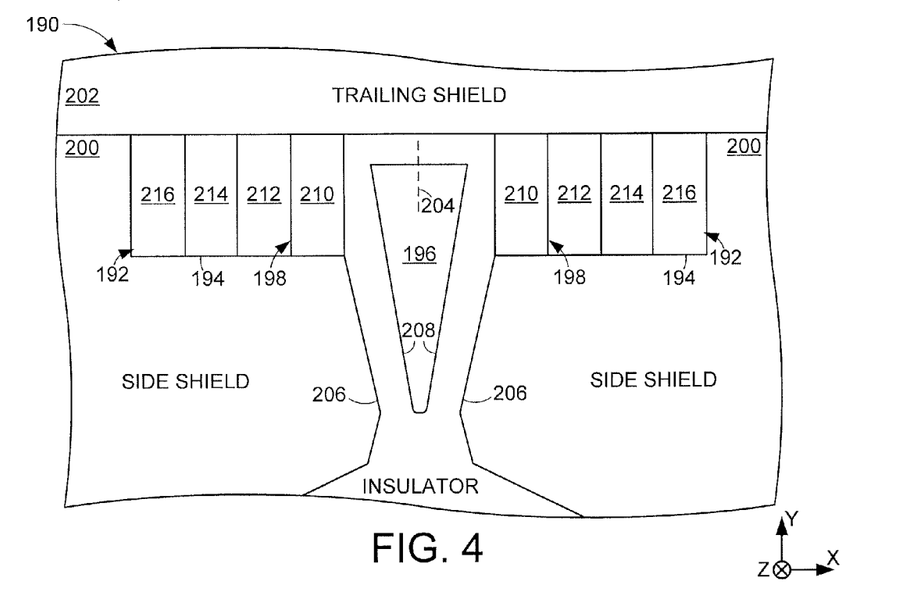
FIG. 4 displays an air bearing view block representation of a portion of an example data writer constructed in accordance with various embodiments.

The continuous lateral extension of each flux density insert layer along the X axis can provide increased shielding capabilities over filling the trailing box region 164 with non-magnetic material that allows errant magnetic flux to uniformly saturate in the cross-track direction, perpendicular to the downtrack direction. Although, the lateral orientation of the flux density insert layers may also migrate flux towards the write pole 168 and increase the risk of shunting. FIG. 4 is an air bearing view block representation of a portion of an example magnetic element 190 employing flux density inserts 192 each tuned in accordance with various embodiments to be horizontal laminations, as opposed to the vertical lamination displayed in FIG. 3.

As shown in FIG. 4, each flux density insert 192 fills the trailing box region 194 on either side of the write pole 196 and each constituent flux density insert layer continuously extends with a vertical sidewall 198 to contact both the side shield 200 and trailing shield 202. The vertically aligned insert layer sidewalls 198 that match the longitudinal axis 204 of the write pole 196 can reduce the distance between the flux density insert 192 and the trailing edge of the write pole 196 by having different angular orientations than the side shield sidewalls 206 and pole sidewalls 208. The amount of non-magnetic insulating material between the trailing edge of the write pole 196 and flux density inserts 192 can be tuned, along with the material selection of the flux density insert layers, to provide increasing saturation flux density as measured from the longitudinal axis 204 of the write pole 196.

For example, the first flux density insert layer 210 that is positioned closest to the write pole 196 can have a lower saturation flux density than the second 212, third 214, and fourth 216 layers that are respectively configured with increasing saturation flux densities. Such increasing saturation flux density laterally from the write pole 196 can provide reduced migration of magnetic fields from and towards the write pole 196 while providing a continuous magnetic flux pathway from the side shields 200 to the trailing shield 202 throughout the trailing box regions 194. Various embodiments tune the at least two of the constituent flux density insert layers to have a common saturation flux density while other embodiments configure the flux density inserts 192 to have a single saturation flux density, such as 0.3 Tesla, corresponding to different materials having differing thicknesses as measured along the X axis.

The diverse varieties of flux density insert configurations illustrated in FIGS. 3 and 4 show how write pole and shield performance can be tuned to provide a predetermined write field amplitude and field-gradient with minimal risk of inadvertent erasure conditions. The direct contact of the side 200 and trailing 202 shields can operate in concert with the flux density inserts 192 to direct errant magnetic fields around and away from the write pole 196. However, the contact of the side 200 and trailing 202 shields can increase shield saturation and risk of write pole 196 shunting. While the side 200 and trailing 202 shields can be disconnected by extending the trailing box region 194 laterally to enhance write pole performance, the increased trailing box region 194 can correspond with higher erasure condition risk as magnetic fields migrate farther from the write pole 196 than if the trailing box region 194 had a closed lateral end.

Figure 5:
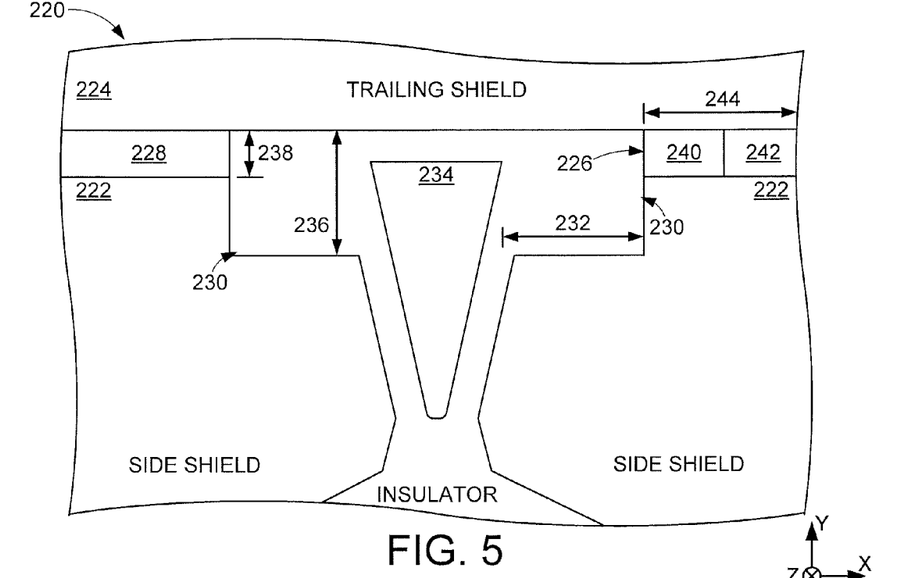
FIG. 5 illustrates an air bearing view block representation of a portion of an example data writer configured in accordance with various embodiments.

Accordingly, the example data writer 220 of FIG. 5 displays how side 222 and/or trailing 224 shields can be connected via flux density inserts 226 and 228 in accordance with some embodiments. Connecting the side 222 and trailing 224 shields via the flux density inserts 226 and/or 228 can reduce shield saturation strength while maintaining shielding performance. The position of the flux density inserts 226 and 228 in notches of a trailing box region 230 allows the trailing box length 232 from the trailing edge of the write pole 234 to be filled with non-magnetic insulating material, which may correspond with increased write field amplitude and field-gradient. It should be noted that while the dissimilar insert 226 and 228 configurations shown in FIG. 5 is possible, such is not limiting as various embodiments use commonly configured inserts on opposite sides of the write pole 234 to provide symmetric shielding on either side of the longitudinal axis of the write pole 234 along the Y axis.

As shown in FIG. 5, each trailing box region 230 has a first thickness 236, as measured along the Y axis, proximal the write pole 234 and a reduced second thickness 238 defined by a notch sidewall 240 that can be angled to gradually or abruptly transition between the thicknesses 236 and 238. The ability to magnetically connect the side 222 and trailing 224 shields via the flux density inserts 226 and 228 allows throttled magnetic field migration between shields 222 and 224 that provides reliable magnetic shielding without increased erasure condition risk. Such magnetic connection between the side 222 and trailing 224 shields can be tuned through flux density insert 226 and 228 material selection and configuration, as illustrated by the single continuous flux density insert 228 compared to the horizontal lamination flux density insert 226 that comprises first 240 and second 242 flux layers having different saturation flux densities, which may be a non-magnetic saturation flux density.

Through the tuned configuration of one, or both, flux density inserts 226 and 228 to continuously extend along the notch length 244 and physically separate the shields 222 and 224, magnetic flux can be isolated to the respective shields 222 and 224 while errant magnetic flux is allowed to be shunted by the flux density inserts 226 and 228 to mitigate flux concentration distal the write pole 234. The combination of a notched trailing box region 230 and tuned flux density insert 226 and 228 that fills the notch while separating the side 222 and trailing 224 shields allows a balance between risk of shunting due to the removal of shielding material proximal the trailing edge of the write pole 234 and risk of erasure due to the lower saturation flux densities of the flux density inserts compared to non-magnetic insulating material and magnetic shields 222 and 224.

Figure 6:
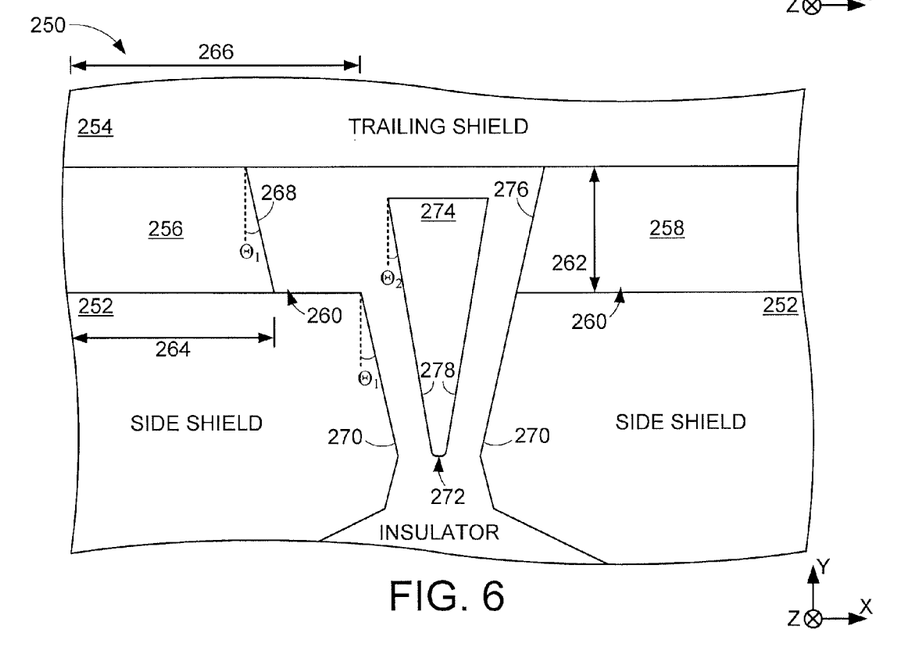
FIG. 6 is an air bearing view block representation of a portion of an example data writer constructed in accordance with some embodiments.

The tuned data writer 220 can provide optimized magnetic shielding and write pole 234 performance, but may induce increased complexity and manufacturing processing, especially in reduced form factor data storage devices. FIG. 6 is an air bearing view block representation of an example data writer 250 constructed in accordance with various embodiments to separate side 252 and trailing 254 shields with flux density inserts 256 and 258 that respectively occupy trailing box regions 260 that have a uniform thickness 262 that extends along the X axis. The use of uniform thickness 262 trailing box regions 260 can reduce complexity and processing time versus varying thickness trailing box configurations, like trailing box region 230 of FIG. 5.

The lack of a trailing box notch can further allow for flux density insert sidewall and length tuning. In the non-limiting example shown in FIG. 6, flux density insert 256 has a continuous material that extends a length 264 that is less than the trailing box region length 266 and is configured with a sidewall 268 angled to match the angle of the side shield 252 sidewall 270 proximal the write pole tip 272 of the write pole 274. The reduced length 264 and angled sidewall 268 of the flux density insert 256 can provide a non-magnetic insulating material to reduce risk of magnetic shunting while the tuned saturation flux density material of the flux inert 256 optimizes shielding and magnetic field migration between the side 252 and trailing 254 shields.

Various embodiments tune a flux density insert like flux density insert 258 with a length that matches the underlying side shield 252 along a horizontal plane positioned a predetermined vertical distance from the write pole tip 272. The flux density insert 258 can have a sidewall 276 angled to match the side shield sidewall 270 and be dissimilar from the write pole sidewall 278 angle $\Theta_2$ so that the side gap between the write pole 274 and side shield 252 increases along the downtrack direction and Y axis so that more non-magnetic insulating material lies between the flux density insert 258 and the write pole 274 than the write pole tip 272 and the side shield 252. Such varying side gap can allow the flux density insert 258 to be farther from the trailing edge of the write pole 274 and reap a reduced shunting risk with increased shielding performance supplied by the larger flux density insert 258 compared to the reduced length flux density insert 256.

It should be noted that while the example data writers 220 and 250 respectively employ differing flux density inserts on opposite lateral sides of a write pole, such configuration is not required or limiting as the flux density inserts can be configured with identical sizes, shapes, and materials in various embodiments. With the proliferation of high data bit density data storage devices that reduce data track widths and have large quantities of stray magnetic fields, the lack of a magnetic shield proximal the write pole tip can correspond with degraded magnetic field amplitude and data writing accuracy. With those challenges in mind, a box shield can be employed to surround the write poles 234 and 274 of FIGS. 5 and 6, respectively, with soft magnetic shield material instead of having side shields 222 and 252 separated by non-magnetic insulating material, as displayed in FIGS. 5 and 6.

Figure 7:
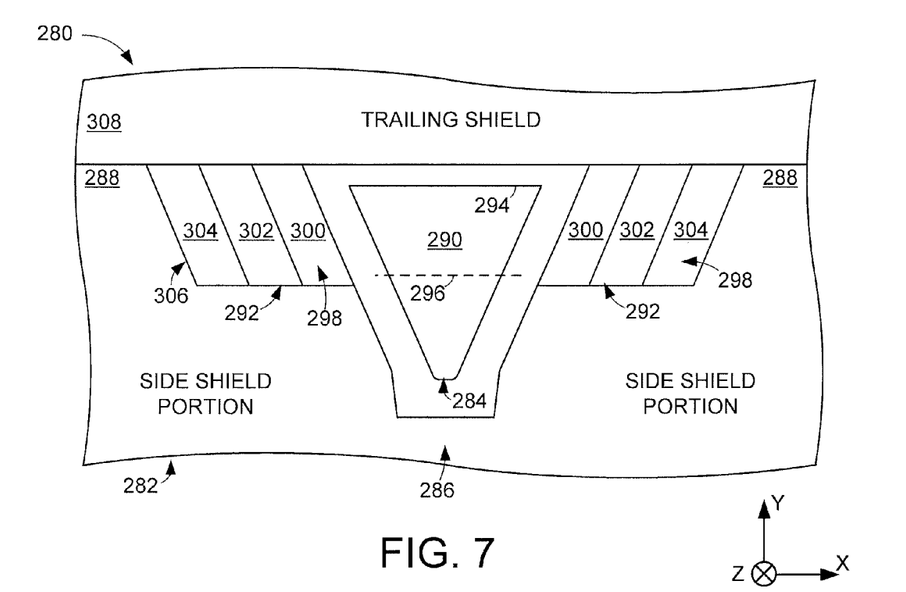
FIG. 7 provides an air bearing view block representation of a portion of an example data writer configured in accordance with various embodiments.

FIG. 7 provides an air bearing view block representation of an example data writer 280 constructed with a box shield 282 that continuously extends around the write pole tip 284 in accordance with some embodiments. The box shield 282 may be a single continuous layer of soft magnetic material or a plurality of shield portions, such as a leading and side shields, contacting at one or more seams. The box shield's 282 position uptrack of the write pole tip 284 can reduce the accumulation of magnetic flux in the throat region 286 between side shield portions 288 and the consequential inadvertent erasure condition.

Conversely, the increased amount of magnetic material in the box shield 282 can increase the chance of magnetic saturation and unwanted shunting with the write pole 290. Such risk may be mitigated by configuring trailing box regions 292 to extend uptrack from the trailing edge 294 to even beyond the median transverse plane 296 of the write pole 290. The increased size of the trailing box regions 292 allows for larger flux density inserts 298 with greater shield flux influence via the tuned saturation flux density of the constituent layers 300, 302, and 304. That is, the material and shape of the flux density inserts 298 can impart a greater influence on the magnetic saturation of the box shield 282 due to the larger physical size of the constituent insert layers 300, 302, and 304.

The flux density insert layers 300, 302, and 304 along with the trailing box sidewall 306 can be shaped, as shown, at a predetermined uniform angle that maintains or increases a side gap distance between the flux density inserts 292 and the write pole 290. Such angled sidewalls can complement the tuned construction of constituent insert layers that positions increasing saturation flux densities according to distance from the write pole 290. As an example, layers 300, 302, and 304 can be constructed with different materials that have progressive saturation flux densities that increase from layer 300 to layer 302 to layer 304. In some embodiments, one or more of the insert layers 300, 302, and 304 can extend to contact the trailing shield 308 while other embodiments magnetically connect the trailing 308 and box 282 shields exclusively by the flux density inserts 298.

Figure 8:
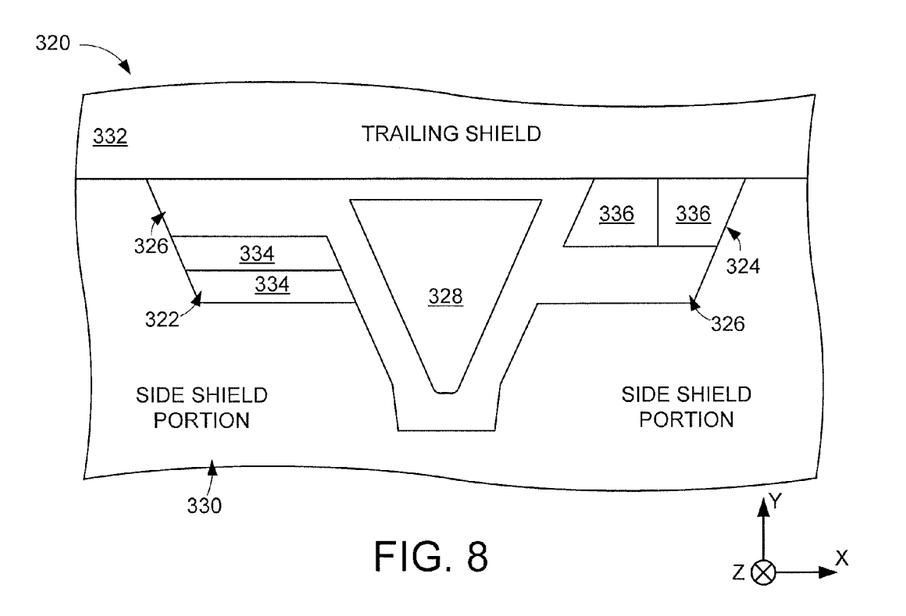
FIG. 8 is an air bearing view block representation of a portion of an example data writer constructed in accordance with some embodiments.

The tuned shape and saturation flux densities of the flux density inserts 298 may mitigate inadvertent shunting while optimizing write pole 290 operation. Various embodiments further adjust the amount of magnetic material positioned in the trailing box regions 292 to reduce the amount of saturated magnetic material proximal the write pole 290. FIG. 8 generally displays an air bearing view block representation of such a configuration in an example data writer 320. As shown, the writer 320 has first 322 and second 324 flux density inserts occupying less than all of the respective trailing box regions 326 positioned on opposite lateral sides of the write pole 328. The trailing box regions 326 each extend beyond a median transverse plane of the write pole 328 and are filled with a combination of flux density insert layers and non-magnetic insulating material that continuously extends to separate the write pole 328 from the box 330 and trailing 332 shields.

With the combination of the flux density inserts 322 and 324 along with the non-magnetic insulating material occupying the trailing box regions 326 in predetermined ratios, less magnetic material is proximal the write pole 328 to reduce the chance of shunting and the flux density inserts 322 and 324 that are present proximal the write pole 328 have tuned magnetic saturation flux densities that minimize the chances of shunting while providing accurate magnetic shielding. While not required, the first flux density insert 322 is disconnected from the trailing shield 332 and positioned uptrack of the non-magnetic material filling the trailing box region 326 while the second flux density insert 324 contacts the trailing shield 332 and is downtrack of the non-magnetic material in the trailing box region 326.

In some embodiments, the differently configured flux density inserts 322 and 324 are used concurrently to provide varying magnetic shielding and flux profiles for the lateral side shield portions of the data writer 320. Non-limiting embodiments may also tune the first flux density insert 322 as a vertical lamination of layers 334 and the second flux density insert 324 as a horizontal lamination of layers 336, as displayed, with the respective layers 334 and 336 having different saturation flux densities. Regardless of the position, number of constituent layers, constituent layer orientation, and amount of trailing box region filled, the flux density inserts 322 and 324 provide magnetic material that optimizes shielding and write pole 328 operation by being tuned to have varying saturation flux densities that are less than the saturation flux density of the box shield 330.

Figure 9:
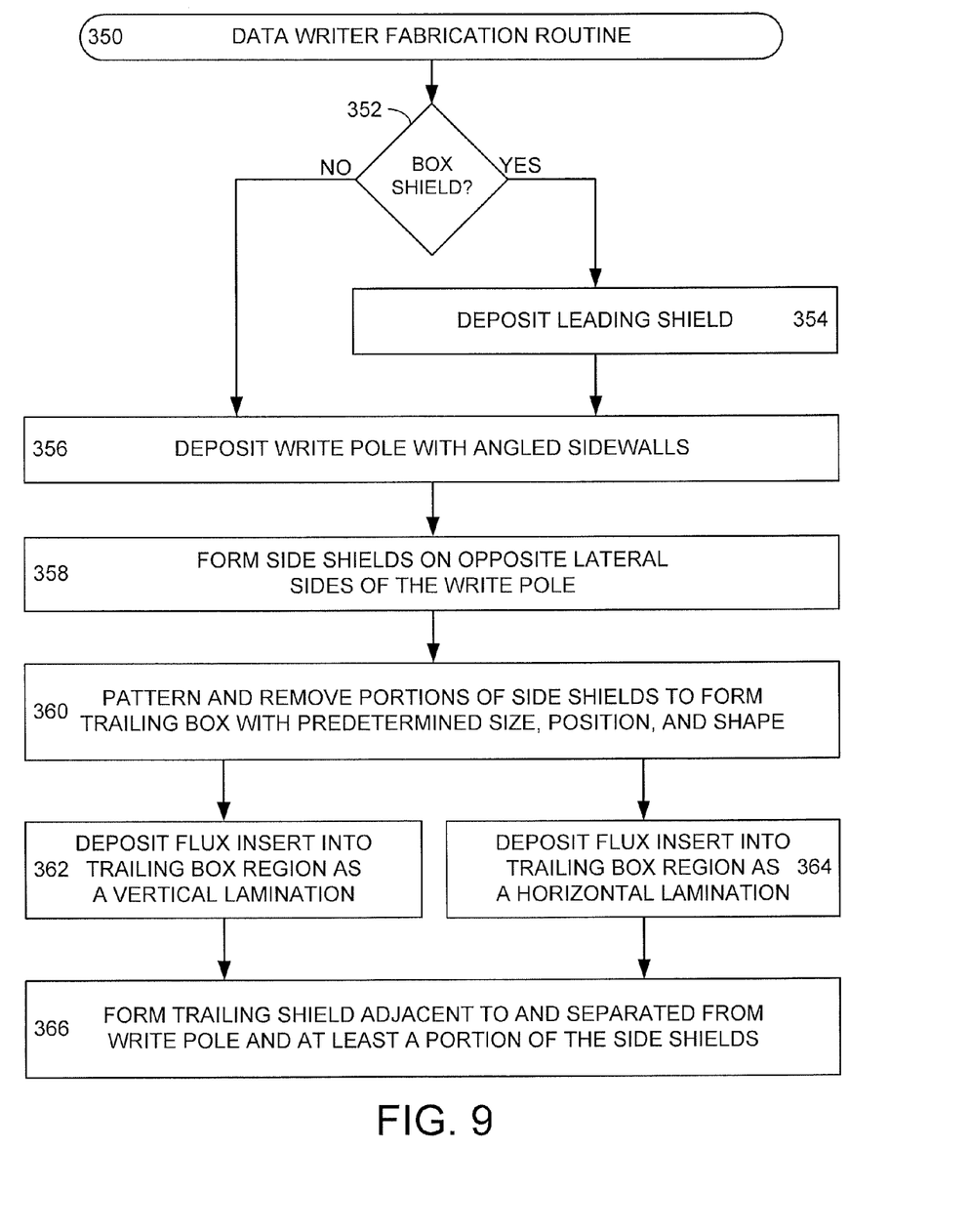
FIG. 9 is a flowchart and associated illustrations for an example data writer fabrication routine in accordance with various embodiments.

With the variety of trailing box and flux density insert configurations possible to optimize data writing performance, the construction of a data writing magnetic element can undergo a series of general and specific steps and decisions. FIG. 9 provides an example data writer fabrication routine 350 conducted in accordance with various embodiments to tune the shielding of a write pole through the construction of at least one flux density insert. The routine 350 can begin by evaluating whether a box shield is to be employed in the data writer in decision 352. If a box shield is to be installed, step 354 deposits a leading shield uptrack from a write pole and aligned along the median longitudinal axis of the write pole.

In the event a box shield is not to be utilized or at the conclusion of step 354, step 356 deposits a write pole with sidewalls angled at predetermined angles. While the formation of a write pole trench should be understood as included into step 356, such action is not required to be done concurrently with the formation of the side shields. For example, the side shields may be formed and then subsequently patterned so that a write pole trench may be created through the removal of shield material in step 358 that forms side shields on opposite lateral sides of the write pole. Step 358 may in some embodiments include the deposition of non-magnetic insulating material within the write pole trench with oblique incidence angle sputtering to ensure continuous coverage of the trench.

The side shields can be configured to continuously extend uptrack from the write pole with specifically angled sidewalls that form a throat region, like region 140 of FIG. 2, if no leading shield is present. Step 358 may further form one or more seams defined by the side shield material contacting the existing leading shield. Next in step 360, at least one side shield is configured with a trailing box region by patterning a predetermined trailing box shape and position before removing portions of the side shield material. Step 360 may form the trailing box sidewalls with angled orientations, such as the sidewall of FIG. 8, notched regions like those shown in FIG. 5, and a lateral length that determines how much direct contact a trailing shield will have with the side shields.

With one or more trailing box regions formed from step 360, at least one flux density insert is then deposited as a vertical lamination of layers, as shown in FIG. 3, in step 362 or deposited as a horizontal lamination of layers, as shown in FIG. 4. It should be understood that steps 362 and 364 each can comprise several depositions of different materials having different saturation flux densities. Such flux density insert layer deposition may further involve the shaping of sidewall angles, such as 45° and 90° with respect to the X axis, to be similar or dissimilar to the angled orientation of the write pole sidewalls. Various embodiments may incorporate non-magnetic layer deposition into the flux density inserts in steps 362 and 364 to fill the trailing box region with both magnetic and non-magnetic material.

The passage from step 360 through either step 362 or 364 in FIG. 9 is not required or limiting as one flux density insert may be formed with step 362 and a second flux density insert can be formed of step 364 to provide an asymmetrical shielding configuration about the write pole. Conversely, it can be appreciated that using a common deposition step between steps 362 and 364 for trailing box regions on opposite sides of a write pole can result in a symmetrical shielding configuration, such as the configuration shown in FIGS. 3 and 4. Finally, step 366 forms a trailing shield atop the trailing box regions. Such trailing shield formation can be positioned to contact some, or none, of the side shields while being separated from the write pole by a non-magnetic insulating material. As shown in FIG. 8, step 366 may result in the trailing shield contacting a previously deposited flux density insert or be separated from the flux density insert by non-magnetic material.

Through the various steps and decision of routine 350, a data writer can be constructed with optimized magnetic shielding and write pole performance. The tuned saturation flux density, size, position relative the write pole, and shape of one or more flux density inserts can provide magnetic shielding material that reduces the risk of shunting while minimizing the chance of an erasure condition. The ability to tune both the configuration of the flux density insert and the trailing box region can allow for precise control of magnetic shielding and write pole operation to conform the data writer to a wide variety of data storage environments, such as high data bit density, rotating media data storage devices.

In addition, while the embodiments have been directed to magnetic programming, it will be appreciated that the claimed invention can readily be utilized in any number of other applications, including data storage device applications. It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a write pole adjacent to and separated from a first side shield and a trailing shield, the first side shield comprising a first magnetic material and configured with a first trailing box region defined by a reduced thickness notch in the side shield and at least partially filled with a first flux density insert comprising a horizontal lamination of a plurality of layers with each layer continuously extending from a common horizontal surface of the trailing box region, the first flux density insert comprising a second magnetic material, different than the first magnetic material.

2. The apparatus of claim 1, wherein a second flux density insert positioned in a second trailing box region of a second side shield comprises a single continuous layer of the second material.

3. The apparatus of claim 1, wherein the second material has a lower saturation flux density than the first material.

4. The apparatus of claim 1, wherein the plurality of layers of the horizontal lamination in the first flux density insert comprises different materials.

5. The apparatus of claim 1, wherein the plurality of layers of the horizontal lamination continuously couple the trailing shield to the first side shield.

6. The apparatus of claim 1, wherein each layer of the plurality of layers has a different saturation flux density.

7. The apparatus of claim 1, wherein each layer of the plurality of layers has a saturation flux density lower than the first material.

8. The apparatus of claim 1, wherein each layer of the plurality of layers has a sidewall angled to match a write pole sidewall angle.

9. The apparatus of claim 1, wherein each layer of the plurality of layers has a sidewall angled to be dissimilar from a write pole sidewall angle.

10. The apparatus of claim 1, wherein the first trailing box region extends from a trailing edge of the write pole to a plane downtrack from a median transverse axis of the write pole.

11. The apparatus of claim 1, wherein the first trailing box region extends to physically disconnect the side shield from the trailing shield.

12. The apparatus of claim 1, wherein the first trailing box region is proximal a trailing edge of the write pole.

13. The apparatus of claim 1, wherein the first and second thicknesses are present on an air bearing surface and the second thickness being greater than the first thickness.

14. The apparatus of claim 1, wherein the second notch is filled with non-magnetic material.

15. The apparatus of claim 1, wherein the flux density insert is separated from the write pole by a length that is half of a pole longitudinal length of the write pole and the flux density insert has a flux longitudinal length greater than half the pole longitudinal length.

16. The apparatus of claim 1, wherein the trailing shield does not contact the first side shield on an air bearing surface.

17. The apparatus of claim 1, wherein the first and second notches of the first trailing box region are connected by a linear notch sidewall that transitions from a first thickness of the first notch to a second thickness of the second notch.

18. A magnetic element comprising a write pole adjacent to and separated from first and second side shields and a trailing shield, each side shield comprising a first magnetic material, the first and second side shields configured to define first and second trailing box regions positioned on opposite sides of the write pole and respectively defined by reduced thickness notches, the first trailing box region at least partially filled with a first flux density insert, each flux density insert comprising a second magnetic material, different than the first magnetic material, each trailing box region positioned uptrack from a trailing edge of the write pole, the first flux density insert being different than a second flux density insert positioned in the second trailing box region.

19. The magnetic element of claim 18, wherein the first and second flux density inserts form an asymmetric shield.

20. An apparatus comprising a write pole adjacent to and separated from side and trailing shields with the side shield comprising a first magnetic material, a flux density insert positioned between and physically separating the side shield from the trailing shield, the flux density insert filling a first notch of a trailing box region and comprising a horizontal lamination of a plurality of layers with each layer continuously extending from a common horizontal surface of the trailing box region, the trailing box region having a second notch with a greater thickness than the first notch, at least one layer of the horizontal lamination comprising a second material having a different saturation flux density than the first material.

* * * * *